Patented July 27, 1943

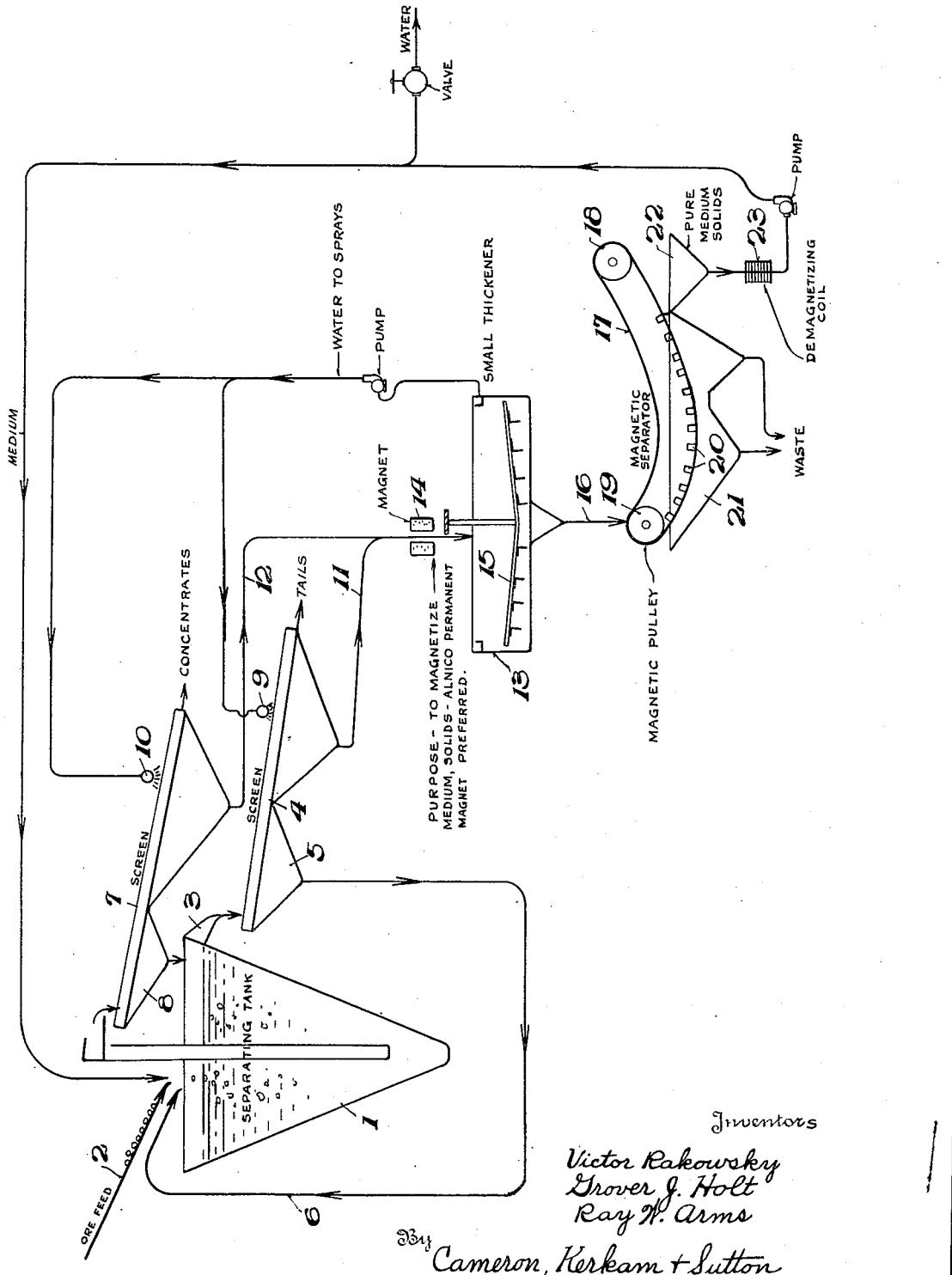

2,325,149

UNITED STATES PATENT OFFICE 2,325,149

PROCESS OF SEPARATING ORES

Victor Rakowsky, Joplin, Mo., Grover J. Holt, St. Paul, Minn., and Ray W. Arms, Evanston, Ill., assignors to Minerals Beneficiation Incorporated, Chicago, Ill., a corporation of Delaware Application July 29, 1940, Serial No. 348,312

6 Claims. (Cl. 209—39)

This invention relates to separation of ore particles and other like materials. As hereinafter used in the description and in the claims the expression "ore particles" is designed to include not only particles of what are strictly known as ores but other like particles, such as coal, etc.

In the sink and float process of separating ore particles the comminuted ore is fed into a separating tank containing a liquid separating medium composed of water and comminuted solids in suspension therein, the specific gravity of the medium being so adjusted that the lighter particles or "tails" float in said medium while the heavier particles or "concentrates" sink therein. The tails overflow from the top of the separating tank, some of the separating medium passing out of the tank therewith, and the concentrates are removed from the tank also with some of the separating medium accompanying them. The tails and concentrates as they are removed are deposited on separate screens, the medium that leaves the tank with the tails passes through the screen and the tails and associated slimes adhering thereto pass downward on the screen to a point where they are sprayed with water to wash the medium therefrom. Likewise, the concentrates with some medium pass from the tank to the upper portion of a screen. Most of the removed medium passes through the screen and returns to the separating tank, while the concentrates, with some of the medium and associated slimes adhering thereto, descend to a lower portion of the screen where they are sprayed with water and the medium washed therefrom.

It will be appreciated that by reason of the fact that a considerable amount of spray water is used, the washed medium from the tails and concentrates with this water contains a greatly reduced proportion of solids as compared with the medium in the separating tank. This wash water, it will be noted, contains a very considerable amount of the comminuted solids used in making up the separating medium, and it is a matter of commercial importance to conserve or recover these used comminuted solids for reuse in the separating medium.

According to the present invention the wash water from both the tails and the concentrates is passed downward into a thickener tank, and on the way to said tank the stream containing the solids and associated slimes is passed through an ordinary block magnet.

The present invention contemplates the use of comminuted solids in the form of magnetic material. When the stream of wash water with the comminuted solids of magnetic material is passed through the block magnet, the solids of magnetic material are magnetized and are fed into a settling tank, or thickener, as it is technically called. As a result of the magnetizing of the magnetic solids, the particles of magnetic solids are magnetically attracted to each other and form little globules or flocs of such solids and associated slimes and sands, with the result that they rapidly settle in the water in the thickener. The overflow water from said thickener is passed therefrom, largely free from the magnetic solids and associated slimes and sands, back to the sprays. By reason of the rate of settling of these flocs, a very much smaller thickener tank can be used. In fact, said thickener tank may be ¼ to ⅙ of the size of the tanks ordinarily heretofore employed.

In the thickener tank a rake is preferably employed to sweep the settled flocs to a delivery point from which they are fed, together with some water, to a magnetic separator which acts to separate the magnetic solids from the water and associated slimes. It has heretofore been proposed to extract magnetic solids from the separating medium by the use of a series of magnets permanently located over a belt travelling on pulleys, the magnets acting to attract and hold the magnetic solids to the belt until it reaches a point beyond that where the water is delivered. At this point the magnets are no longer present and the magnetic solids drop from the belt into a receptacle prepared for that purpose. In such process the magnetic solids are elevated to and held to the belt against the action of gravity, and the full volume of water which leaves the thickener on the way to the magnetic separating belt is passed through the magnetic separator.

According to the present invention water, carrying the flocs of magnetic solids and aggregated slimes and sands, is delivered from the thickener above the belt at a point where it passes over a magnetic pulley. The result is that the flocs of magnetic solids slimes and sands are not delivered to the belt against the action of gravity; on the contrary, gravity is used as a means of feeding them to the belt, gravity acting in conjunction with the magnetism of the pulley. As the belt passes around the magnetic pulley, the water is to a very great extent dropped into a receptacle under the belt, and the flocs of magnetic solids are held to the belt, as it leaves the pulley, by means of a series of magnets, the alternate magnets being of opposite poles. As the belt passes beneath these magnets, the flocs of magnetized solids are broken up by reason of their passage beneath the magnets of opposite polarity, but the solids are held to the belt by the magnets, while sands and associated slimes which are locked up in such aggregates are freed and fall into the receptacle provided for the water. By reason of the fact that the series of magnets above the belt are of alternate polarity these magnetized solids are rotated or turned as they pass under the several magnets, so that by the time they reach the end of the series of magnets practically all of the slimes and sands that are associated with the solids are released and fall into the vat beneath. After passing beyond the vat for the reception of the water and slimes and sands beneath the belt, the belt passes over a receptacle for receiving the comminuted solid, and at this point no magnets are present. The result is that the solids are no longer held to the belt by the magnets and fall therefrom into the receptacle. These solids, however, when deposited in such receptacle are magnetized solids, and as such they are not suitable for use in the separating medium. Accordingly, the solids are then passed through a demagnetizing coil from which they are passed back to the separating tank, as required. On their return to the separating tank the solids are accompanied by such a controlled amount of water as conditions may require.

One of the outstanding advantages of this process of recovering magnetic solids is found in the fact that only a small amount of water is used to feed the magnetized solids to the belt and the rapidity of action of the separator is greatly increased over that heretofore secured in magnetic separators. Furthermore, by magnetizing the magnetic solids and thus aggregating slimes and sands therewith a much smaller thickener can be employed, as above indicated. A still further outstanding advantage is that by reason of the reverse polarity of the magnets under which the magnetic solids are passed, the slimes and sands associated therewith are very much more efficiently removed.

While the above description has been given in connection with certain specified apparatus, it will be understood that the specific form of the apparatus may be varied without departing from the spirit of the invention.

For the purpose of illustrating the invention, reference is made to the accompanying flow sheet, in which 1 is a separating tank; 2 is a chute for the ore feed into said tank; 3 is the overflow of the tails from the tank onto the screen 4; 5 is a receptacle for the liquid medium that passes through the screen 4 and is returned to the separating tank through the pipe 6 by pump or otherwise; 7 is a screen onto which the concentrates are delivered; 8 is a receptacle through which the liquid medium that leaves the tank with the concentrates passes and from which it is directed into the tank 1.

Above the screens 4 and 7 are sprays 9 and 10 which serve to wash the medium with its associated slimes and sands from the tails and concentrates, as above described. 11 and 12 are conduits delivering the wash water with its associated solids and slimes to the thickener 13. Preferably the conduit is of rubber or other flexible hose where it passes through a magnet 14. 15 is a rake in the thickener tank 13 which delivers the thickened medium through the conduit 16 to a belt 17 passing around two pulleys 18 and 19, the pulley 19 being a magnetic pulley, and the conduit 16 delivers the medium onto the belt above the magnetic pulley 19. The magnetic solids of the medium are attracted and held to the belt through the medium of the magnetic pulley, and the belt passes around and leaves the under side of the pulley and passes immediately under a series 20 of magnets of alternate polarity. The water, as it passes over the pulley falls into the vat 21 except, of course, such small portion as adheres to the aggregates of magnetic solids and associated slimes and sands. As the belt passes under the series of magnets 20 the alternate polarity of the magnets serves to reverse the magnetic solids as they pass from each magnet to the next successive one. By reason of the long series of magnets, this reversal occurs over and over again with the result that the aggregates of the magnetized solids are broken up and the associated slimes and sands are freed and drop into the vat 21. When, however, the belt reaches a point beyond the magnets, the magnetic solids are freed from the belt and fall into a tank 22. These solids are magnetized and in order that they may be reused they must be demagnetized. Accordingly they are passed from the receptacle 22 through a demagnetizing coil 23 from which point they may be delivered by a pump or otherwise to the separating tank as required, together with such an amount of water as is necessary to establish the required specific gravity of the medium.

What is claimed is:

1. In a process of separating ore particles, the steps of introducing said particles into a separating tank containing a liquid separating medium comprising water and comminuted magnetic solids and in which medium the lighter ore particles or tails float and the heavier particles or concentrates sink, separately removing the tails and concentrates from the tank, each of them accompanied with some of the medium, screening the medium from the tails and concentrates, and returning said screened medium to the separating tank leaving the tails and concentrates with some of the medium and associated slimes adhering thereto, washing the adhering medium and associated slimes from the tails and concentrates, magnetizing the solids in said wash water, collecting the magnetized solids in a thickener, then passing the same with a flow of water to a belt passing around a magnetic pulley whereby the said magnetic solids are attached to and pass over the pulley with the belt, passing the said belt with the magnetic solids adhering thereto under a series of magnets having alternate polarities, delivering the said solids from the belt to a demagnetizing coil and returning said solids to the separating tank.

2. In a process of separating ore particles, the steps of introducing said particles into a separating tank containing a liquid separating medium comprising water and comminuted magnetic solids and in which medium the lighter ore particles or tails float and the heavier particles or concentrates sink, separately removing the tails and concentrates from the tank, each of them accompanied with some of the medium, screening medium from the tails and concentrates, and returning said screened medium to the separating tank leaving the tails and concentrates with some of the medium and associated slimes adhering thereto, washing adhering magnetic solids and associated slimes from the tails and concentrates, magnetizing the solids in said wash water, thereby forming aggregates of said solids and slimes, collecting the magnetized solids and aggregated slimes with some water in a thickener, then separating the magnetized solids from the slimes and a part of the water by magnetic action, demagnetizing said solids and returning the same to the separating tank.

3. In a process of separating ore particles, the steps of introducing said particles into a separating tank containing a liquid separating medium comprising water and comminuted magnetic solids and in which medium the lighter ore particles or tails float and the heavier particles or concentrates sink, separately removing the tails and concentrates from the tank, each of them accompanied with some of the medium, screening medium from the tails and concentrates, and returning screened medium to the separating tank leaving the tails and concentrates with some of the magnetic solids of the medium and associated slimes adhering thereto, washing the said adhering solids and associated slimes from the tails and concentrates, magnetizing the solids in said wash water, thereby forming aggregates thereof, settling the said aggregates in a thickener, and using water from the thickener to spray additional tails and concentrates from the separating tank.

4. In a process of separating ore particles, the steps of introducing said particles into a separating tank containing a liquid separating medium comprising water and comminuted magnetic solids and in which medium the lighter ore particles or tails float and the heavier particles or concentrates sink, separately removing the tails and concentrates from the tank, each of them accompanied with some of the solids of the medium together with slimes and sands, washing the said solids with associated slimes and sands from the tails and concentrates, aggregating the magnetic solids together with slimes and sands by subjecting the current of wash water to magnetic action, settling the aggregates in a thickener, and subjecting the settled portion from the thickener to a series of magnets, the alternate magnets of which series are of opposite polarities, whereby the slimes and sands are separated from the magnetic solids.

5. In a process of separating ores in a liquid gravity separating medium composed of water and comminuted magnetic solids, the steps of spraying with water magnetic solids together with associated sands and slimes from the separated ore particles, magnetizing the same while in the current of wash water, whereby aggregates of said magnetic solids, sands and slimes are formed, then conducting the wash water with said aggregates to a suitable tank and settling said aggregates therein by gravity, and returning water thus clarified to the sprays.

6. In a process of separating ore by a separating medium composed of water and comminuted magnetic solids, the steps of washing adhering solids together with associated sands and slimes from separated ore particles, subjecting the current of wash water together with said solids, slimes and sands to magnetic action, whereby aggregates of said solids, slimes and sands are formed, then passing the current of wash water together with said aggregates into a thickener, settling the aggregates in said thickener by gravity, and using clarified water from said thickener to wash additional separated ore particles.

VICTOR RAKOWSKY.
GROVER J. HOLT.
RAY W. ARMS.